(12) United States Patent
Knutson et al.

(10) Patent No.: US 7,562,338 B2
(45) Date of Patent: Jul. 14, 2009

(54) SYSTEM DEVELOPMENT PLANNING TOOL

(75) Inventors: Jef W. Knutson, Denver, CO (US); Phillip Hilgert, Silverthorne, CO (US)

(73) Assignee: Qwest Communications International Inc., Denver, CO (US)

( * ) Notice: Subject to any disclaimer, the term of this patent is extended or adjusted under 35 U.S.C. 154(b) by 890 days.

(21) Appl. No.: 10/721,812

(22) Filed: Nov. 24, 2003

(65) Prior Publication Data
US 2005/0114830 A1 May 26, 2005

(51) Int. Cl.
*G06F 9/44* (2006.01)
(52) U.S. Cl. .................. 717/101; 717/102; 717/105; 717/123
(58) Field of Classification Search ............. 717/100, 717/101, 105; 714/38–43; 345/771
See application file for complete search history.

(56) References Cited

U.S. PATENT DOCUMENTS

| | | | | |
|---|---|---|---|---|
| 5,859,963 | A * | 1/1999 | O'Dowd et al. | 714/38 |
| 6,519,763 | B1 * | 2/2003 | Kaufer et al. | 717/101 |
| 2003/0058280 | A1 * | 3/2003 | Molinari et al. | 345/771 |
| 2004/0064760 | A1 * | 4/2004 | Hicks et al. | 714/43 |
| 2004/0153830 | A1 * | 8/2004 | Cebula et al. | 714/38 |
| 2004/0243968 | A1 * | 12/2004 | Hecksel | 717/100 |
| 2005/0015675 | A1 * | 1/2005 | Kolawa et al. | 714/38 |
| 2005/0039163 | A1 * | 2/2005 | Barrett et al. | 717/105 |
| 2006/0010418 | A1 * | 1/2006 | Gupta et al. | 717/101 |

* cited by examiner

*Primary Examiner*—Lewis A Bullock, Jr.
*Assistant Examiner*—Michael Yaary (57) ABSTRACT

A system for planning and managing a software development project uses an extreme programming (XP) process and includes a graphical user interface (GUI) for displaying graphs and for entering, displaying and modifying underlying planning data. In one embodiment, the GUI includes first, second and third windows. The first window displays bar graphs reflecting both estimated development work and available resources (developer hours) for working on development. The second window displays bar graphs representing both estimated testing work and available resources for working on testing. The third window displays underlying data (e.g., project components and assignment of project components to scheduled development periods). A project manager may use the third window to adjust underlying data in order to better balance work and resources displayed in the first and second windows. Additional underlying data (individual developers, assigned hours, estimates of work on individual project components, etc.) may be displayed in other windows.

19 Claims, 12 Drawing Sheets

User Stories

| # | User Story | Scheduled Iter # | Total Accept Test Hrs | Base Regress Test Hrs |
|---|---|---|---|---|
| 1 | Add "Package Edit" Logic | 4 | 14.0 | 2.0 |
| 2 | Update "Package Display" Screen | 4 | 13.0 | 2.0 |
| 3 | Batch Support for "Package Edit" | 4 | 30.0 | 4.0 |
| 4 | IB Adapter | 2 | 31.0 | 8.0 |
| 5 | Masterfile Access | 3 | 28.0 | 3.0 |
| 6 | Re-Sync Feature for Daily Updates | 2 | 51.0 | 6.0 |
| 7 | New Small Business Screen | 2 | 14.0 | 6.0 |
| 8 | DSL Accessories Items | 2 | 37.0 | 8.0 |
| 9 | DSL Packaging Logic | 1 | 43.0 | 10.0 |
| 10 | Staging Server Daily Updates | 3 | 37.0 | 4.5 |
| 11 | CDW Inputs to Staging Server | 1 | 51.0 | 7.5 |
| 12 | Staging Server Weekly Updates | 4 | 32.0 | 3.0 |
| 13 | Add "Existing Orders" Edits | 4 | 20.0 | 2.0 |
| 14 | Add "In Progress" Fields to Table | 5 | 12.0 | 1.5 |
| 15 | Add "Action Now" Fields to Table | 5 | 12.0 | 1.5 |
| 16 | Modify "Pending" Fields to Table | 4 | 12.0 | 3.0 |

| Y | Occurs across ALL Iterations |
|---|---|
| △ | Regression Testing |
| N | Occurs primarily in FINAL Iteration |

SYSTEM DEVELOPMENT PLANNING TOOL

CROSS-REFERENCES TO RELATED APPLICATIONS

NOT APPLICABLE

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

Development of complex software systems tend to be time consuming and difficult to complete because of frequently changing customer requirements. Traditional software development project management theory often mandates the creation of a "requirements" document that describes the functionality and features of the software system to be developed. A software development organization will create the requirements document based on input from the customer, and then have the customer approve the document so as to "lock" in the expectations of the customer and conduct the development work against a plan that does not change.

Unfortunately, customers often do not have a firm idea of all their requirements until after development has started. Also, changing business needs will often dictate changes in system requirements as the software development project is underway. The result is often frustration for both software developers and their customers. Software developers want some finality in the requirements document, so that customer requested changes do not lead to continually redesigning or redoing development work without ever getting to project completion. Customers, on the other hand, desire (and sometimes feel compelled to make) changes in requirements as their needs change, especially in large projects where at the end of a development period the needs of a business may have change so dramatically from those in the beginning, that the end work product will be outdated and not useful if the requirements document remains static from start to finish.

One recent change in software development processes to address the forgoing problems has been the use of Extreme Programming (XP). A complete description of the XP process can be found in Beck, K., *Extreme Programming Explained: Embrace Change* (Boston, Mass., Addison-Wesley 2000) and Auer, K. and Miller, R., *Extreme Programming Applied: Playing to Win* (Boston, Mass., Addison-Wesley 2002).

In an XP process, a complete project requirements document is eliminated in favor of a more dynamic process, in which customers help define smaller more discrete sets of requirements (referred to as "user stories"), which are each a short description (perhaps no more than a few sentences) as to what the customer needs. The software code to implement the user story is intended to be developed within a short interval of time, say, two weeks (which interval is referred to as an "iteration"). During each iteration, there may several user stories to be completed. The number of hours (often referred to as "velocity" in the XP process) estimated for development of user stories in an iteration are matched to the development resources (developer hours or velocity) available for that iteration. For flexibility, the customer may develop new user stories as time goes along to incorporate changing requirements, and there is continuous collaboration and feedback between the developer and the customer. As a result, not only are requirements met shortly after articulated by the customer, but the customer also gets more realistic estimates of completion dates for each "user story" in the project as the user stories are created.

While the XP process is often appropriate for smaller development projects, it is less useful for a project that is complex, involving a large, costly set of requirements with a large number of individual developers. This is especially true when there are legacy or existing systems with which the developed software system will need to work.

One problem with XP in a larger development project is that corporate governance considerations often require that the process be formalized in a written document (or other tangible form) that can be used to support the scope and cost of the project should it be questioned by shareholders or regulators. A further problem with XP in a large project is the common need for the developed software system to work with existing systems. In such cases, the amount of testing of the developed system increases dramatically (all components, i.e., user stories, of the developed system need to be tested not only for individual acceptance, but also tested to make sure they work with each other, and further to make sure they work with every one of the existing systems). The XP process, because of its emphasis on efficiency and less formality, tends to look at testing as an extension of development, to be articulated and worked on in the same way and at the same time as actual development. Complex testing requirements (involving interrelationships with existing systems) are frequently overlooked or underestimated.

BRIEF SUMMARY OF THE INVENTION

There are a number of embodiments of the present invention. In accordance with one embodiment, there is provided a system and method for planning a software development project. The project has a number of project components and a series of development periods, with each project component assigned to one of the development periods. For each development period there is an estimated amount of work and a planned amount of resources. The development project involves both the development of project components as well as the testing of the project components. The system includes a graphical user interface (GUI) for displaying a first graph illustrating both the work and the resources for the development of project components and a second graph illustrating both the work and the resources for the testing of project components. In a further embodiment, the GUI displays data underlying the graphs, so that by adjusting the underlying data the impact of the adjustment can be observed at least at one of the first and second graphs.

DETAILED DESCRIPTION OF THE INVENTION

Figure 1:
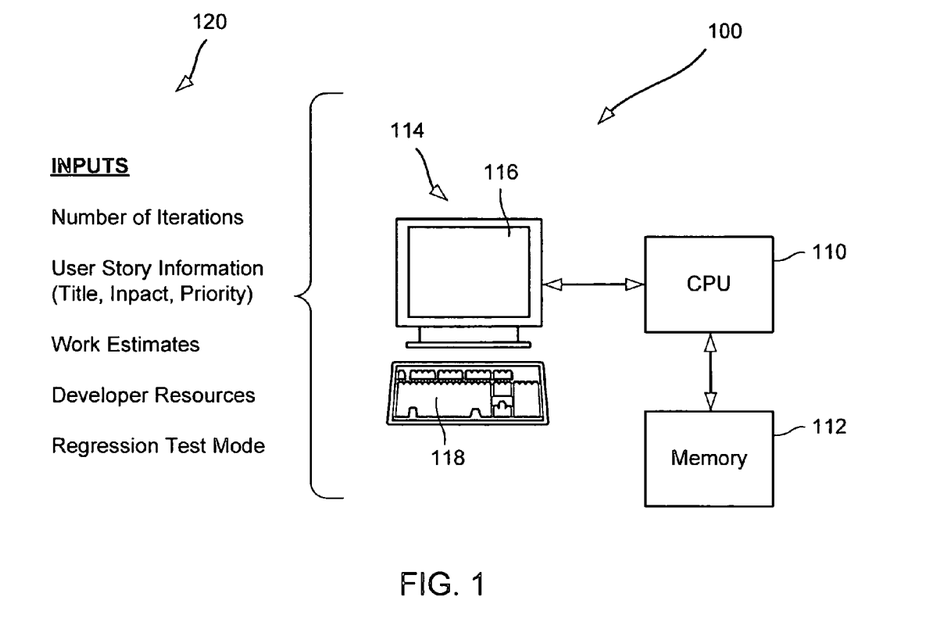
FIG. 1 is a block diagram of a system used as a development planning tool in accordance with one embodiment of the present invention.

There are various embodiments and configurations for implementing the present invention. On such implementation is shown in FIG. 1, where according to an embodiment of the invention, a system 100 is programmed to operate as a tool for use in the planning or management of a software development project. The system 100 includes a CPU 110 that executes software programs implementing the project management process, a memory 112 for storing data and programs used in the process, and a user interface 114 (illustrated as a PC monitor or display screen 116 and an associated keyboard 118) for enabling a user (project manager) to plan and manage the development project.

As illustrated in FIG. 1, various kinds of information 120 relating to the development project is entered by the project manager at the user interface 114. Such information (inputs) will be described in greater detail later, but as illustrated in FIG. 1 it includes:

Number of Iterations—The number of iterations (development work intervals or periods) in the project. In the embodiment to be described more fully below, each iteration consists of 10 working days (i.e., two work weeks—excluding the 2 weekend days interposed between the work weeks).

User Story Information—Each user story is a short description (usually only a few sentences) of discrete functionality that the user (customer) wants in the developed software. In most cases a user story is written solely by the user, and represents a component of the development work intended to be completed within a short period of time (e.g., within one iteration). While not illustrated herein, the project manager may often break a user story into several tasks to which development personnel are assigned. The user story information inputted at system 100 are User Story Title, Impact, and Priority. Impact is a two condition input (BU or IT) indicating whether the story functionality has been requested by the user (BU), or whether the functionality was requested (and recognized as needed) by the project manager or developer (IT), independently of the user. Priority is a three condition input (low, medium, or high) indicating the priority or importance of the user story to the project.

Work Estimates—A project manager's estimate (in hours) of work that will be required to complete the user story. The project manager separately estimates development work and testing work.

Developer Resources—The individual developers working on the project and the extent of their availability to work. Specifically, the project manger identifies each individual developer, the number of hours they are available to work, and the level of effort or LOE (percentage of their available time) that will be dedicated to the project. The result (available hours×LOE—calculated for subsequent display) is the number of hours (developer velocity) planned for or assigned to the project.

Regression Test Mode—The project manager indicates whether regression testing will be ongoing during the project or will be conducted as each user story is completed. Regression testing is the testing of the code and functionality of each user story against previous user stories and also against legacy (existing) systems—to determine if the functionality of the user story will be maintained when integrated with other stories or legacy systems. Regression testing is to be contrasted to acceptance testing, during which a user story is normally tested for functionality in a free standing environment (without being integrated with other user stories or legacy systems).

Figure 2:
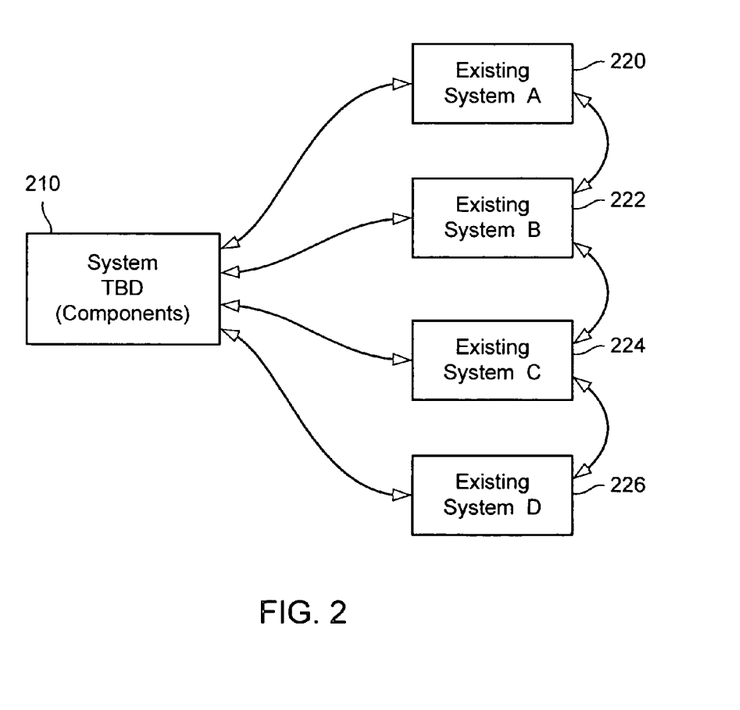
FIG. 2 shows the inter relationships between several systems (including a system to be developed and several existing systems), illustrating an environment in which the development planning tool of FIG. 1 might be used.

As has been mentioned, testing is an important part of software development, but becomes an even more important and significant part of the total development effort when there are existing systems. This is illustrated in FIG. 2, wherein there is seen a system to be developed (system TBD) 210. The development of the system TBD 210 is intended to be managed using various tools implemented by embodiments of the present invention. Thus the system TBD 210 is developed as a plurality of software components (e.g., represented by individual user stories). Furthermore, the system TBD 210 (once completed) is intended to operate with a plurality of existing or legacy systems A through D (designated 220, 222, 224 and 226). The System TBD 210 and the existing systems 220-226 are developed to work together (e.g., to share data).

The system TBD 210 has to not only be fully developed and coded, but also each component therein is then tested for acceptance (conformance to expected functionality when free standing). Further, when the system TBD 210 is integrated or otherwise put in its normal operating environment (with other components within the system TBD 210 and with the existing systems 220-226), each component of the developed software is subjected to regression testing, i.e., having its functionality tested when integrated with every other component of the developed software and further tested when integrated with each existing system. The greater the number of existing systems, the more extensive and complex the regression testing, and the more significant regression testing becomes a part of the overall development project.

Figure 3:
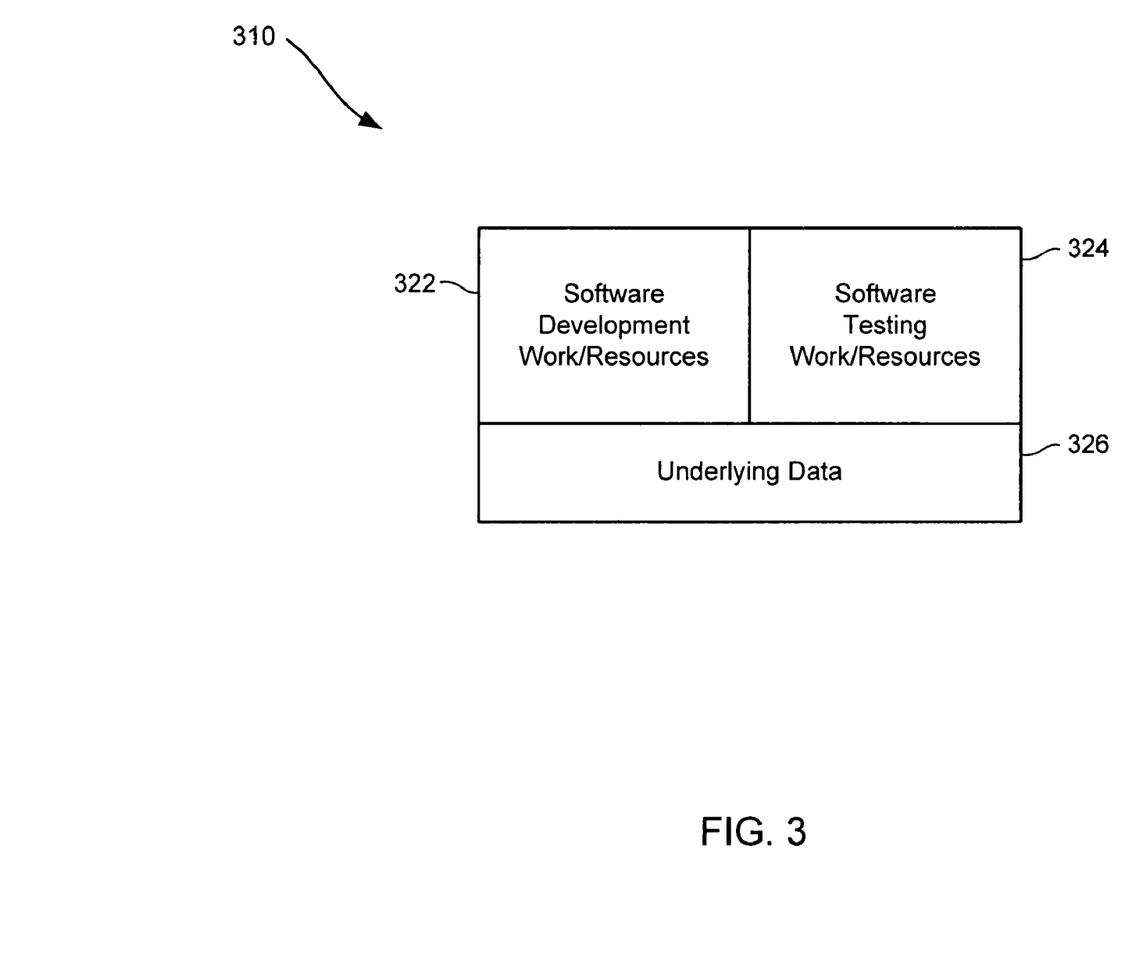
FIG. 3 illustrates the arrangement of windows on the display screen of the system of FIG. 1.

Turning to FIG. 3, the functional components of a graphical user interface (GUI) or screen display 310 in accordance with one embodiment of the invention is illustrated. The display would be seen on the PC screen 116 illustrated as part of the user interface 114 (FIG. 1). The display 310 has three display components or windows that are simultaneously viewed: a software development work/resources window 322, a software testing work/resources window 324, and an underlying data window 326. The details of the three windows will be described below in conjunction with FIGS. 4 through 6. However, briefly, the three windows are intended to provide the user or project manager a convenient means to visually monitor and plan the development project, by separately viewing on one screen (1) graphs at window 322 representing the amount of development work and development resources that are planned for the project (for purposes of describing window 322, "development work and development resources" refer to work and resources other than those involved in testing the developed software), (2) graphs at window 324 representing the amount of testing work and testing resources that are planned for the project, and (3) a display or chart at window 326 reflecting some or all of underlying data that has been entered by the user to produce the graphs in windows 322 and 324. As will also be described later, the underlying data in window 326 may be changed or modified by the user during management of the project, with the resulting changes to the graphs seen at windows 322 and 326.

It should be noted before proceeding further that the separate displays for development and testing at windows 322 and 324 permit the project manager to better monitor and manage the overall project. Since development and testing are both substantial activities (when managing complex software development projects), involving different work activities, planning assumptions and sometimes personnel, the manager can better manage the project by planning and monitoring development and testing separately.

Figure 4:
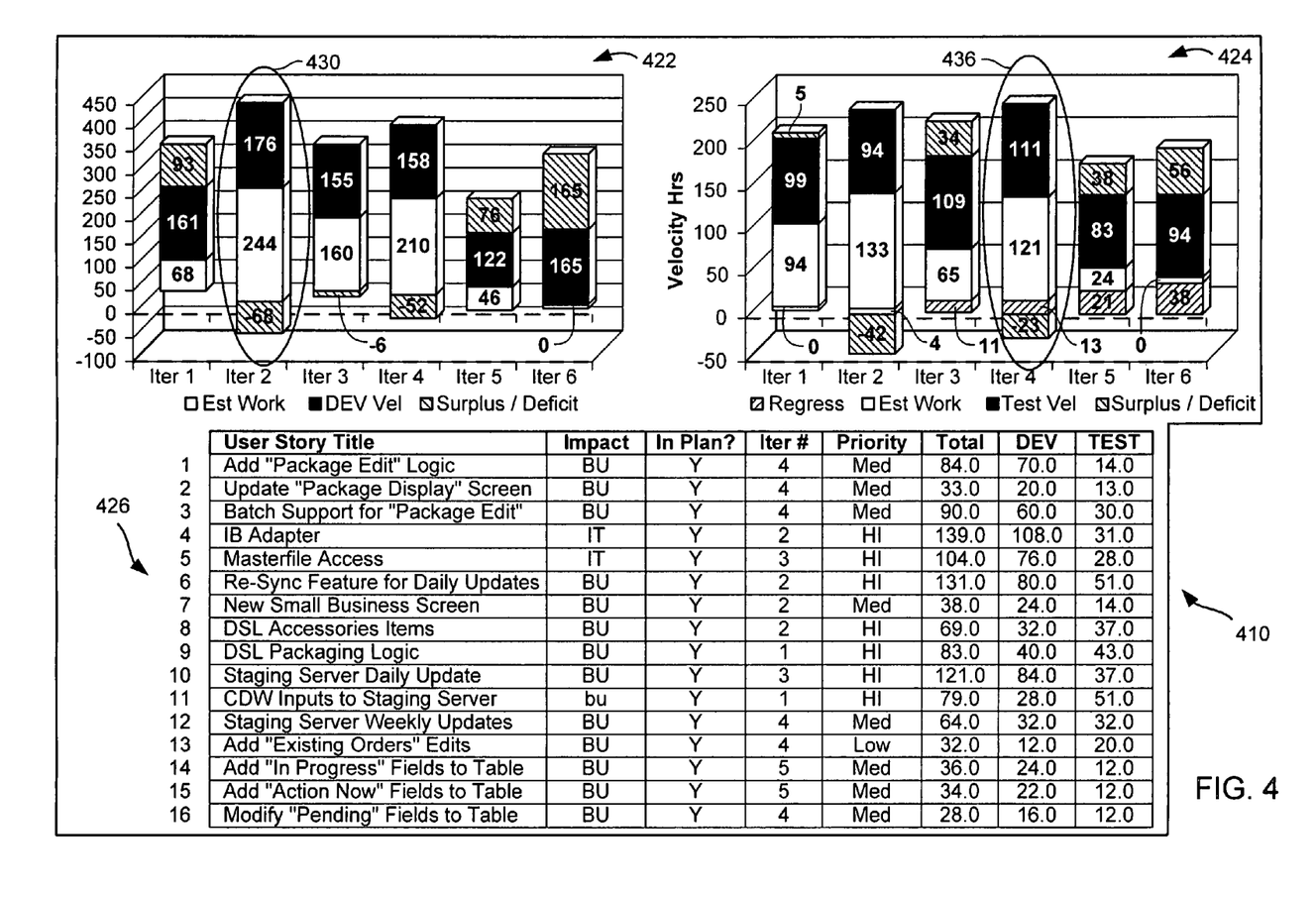
FIG. 4 through 10 are various examples of the graphs and underlying data that might be seen on the display screen.
Figure 5:
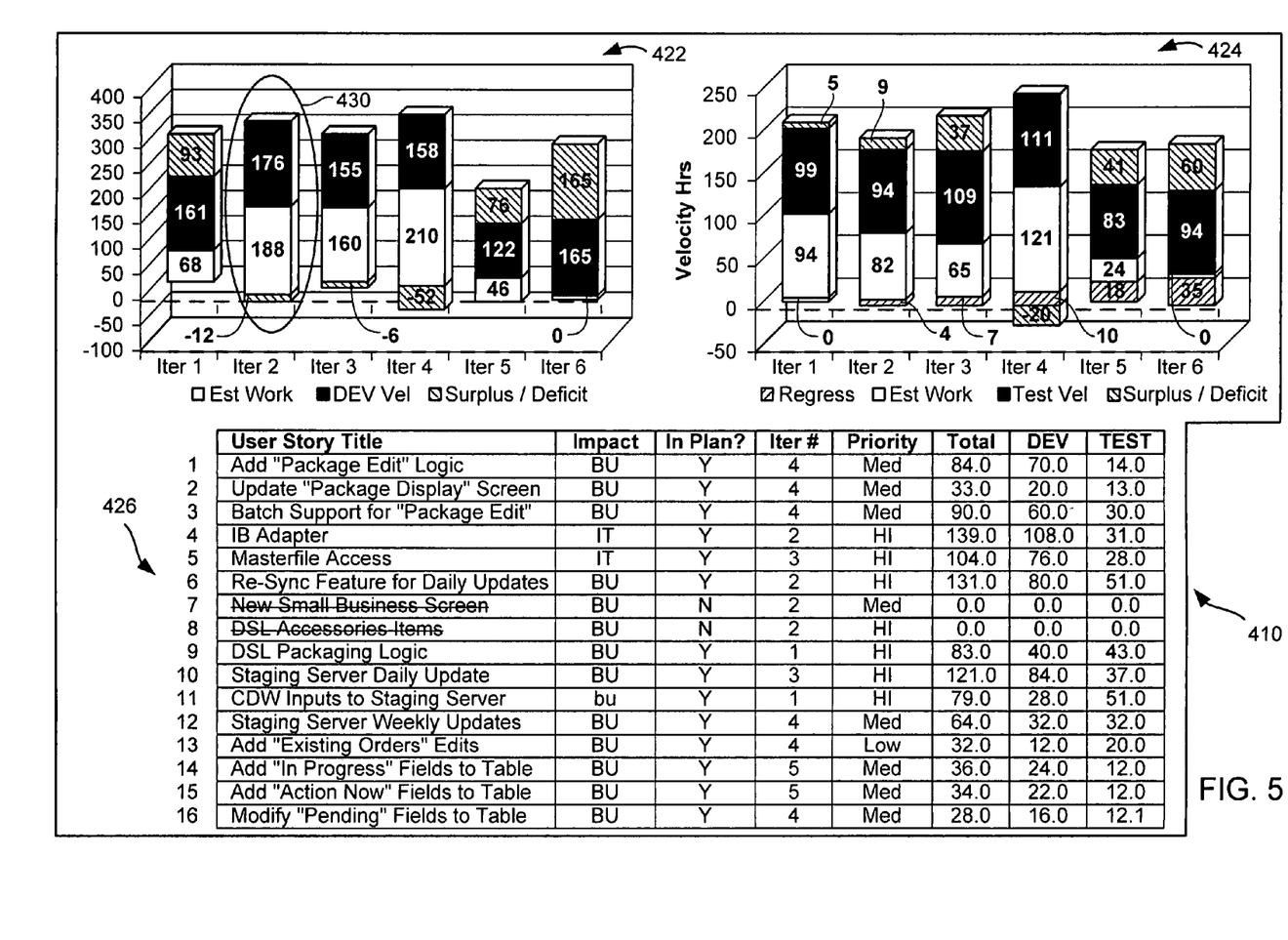
Figure 6:
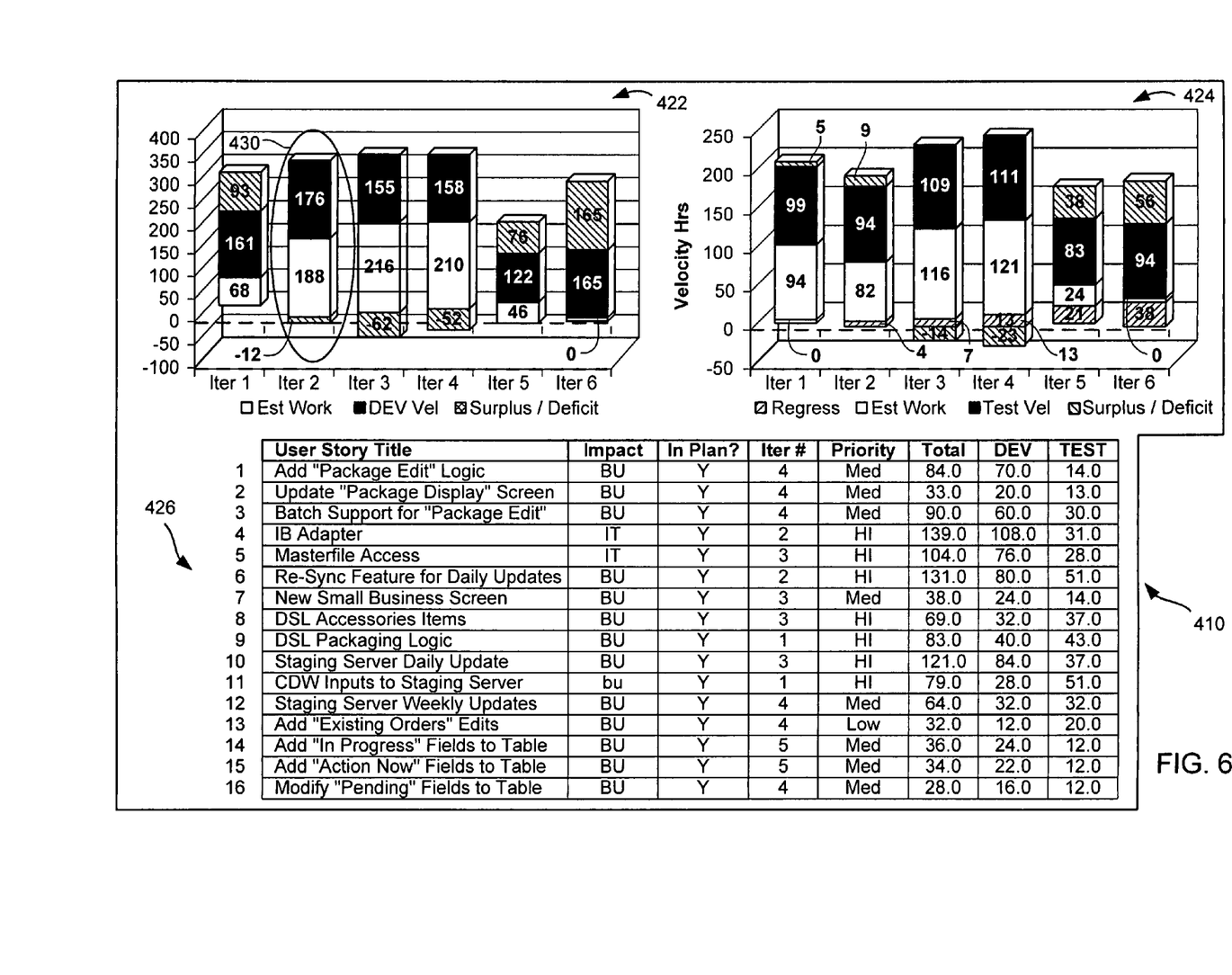

The foregoing will be better understood by referring to FIGS. 4 through 6, which illustrate in detail the graphs and data displayed at each of the windows 322, 324 and 326 in FIG. 3. Turning first to FIG. 4, there is seen a screen display 410 consisting of a development work/resources window 422, a testing work/resources window 424, and an underlying data window 426 (corresponding to the windows 322, 324 and 326, respectively, in FIG. 3). The windows 422 and 424 display bar graphs representing the estimated work (in hours of work) and the estimated development resources (in developer hours) for each iteration of the development project (for purposes of the present description only iteration nos. 1 through 6 are shown). In addition the surplus/deficit of such hours is shown for each iteration (i.e., the developer hours in excess of that needed or below that needed in relation to the estimated work). As an example, referring to window 422, iteration no. 2 ("Iter 2") has bar graphs (designated by reference numeral 430), illustrating for such iteration that the project manager has estimated the development work ("Est Work") at 244 hours, has allocated 176 hours of developer time ("Dev Vel"), and thus has a deficit ("Surplus/Deficit") of −68 hours.

Similar bar graphs are seen in window 424 (for testing). However, in window 424 there are four bars possible for testing during each iteration. The estimated testing work is represented by two bars—estimated acceptance testing work ("Est Work") and estimated regression testing work ("Regress"). There is also a bar reflecting the allocated test developer hours ("TEST Vel"), and a bar representing the surplus or deficit. As an example, iteration no. 4 in window 424 has bar graphs (designated by reference numeral 436) illustrating for such iteration that the project manager has estimated the acceptance testing ("Est work") at 121 hours, has estimated regression testing ("Regress") at 13 hours, has allocated 111 hours of test developer time ("TEST Vel"), and thus has a deficit ("Surplus/Deficit") of −23 hours.

Window 426 shows some of the data used to produce the bar graphs in windows 422 and 424, as well as other data useful to the project manager in evaluating those aspects of the project represented by the bar graphs. Thus, as seen in FIG. 4, window 426 reflects underlying data in the form of a chart, showing the title of each user story ("User Story Title"), the "Impact" (so that project manager can determine from the screen whether the user story was requested by the user or customer (BU) or was deemed to be necessary by the developers (IT)), whether the user story remains "In Plan" (all are indicated as "Y" for yes, and thus all are in the project plan in FIG. 4), the iteration the user story has been assigned to for completion ("Iter #"), the "Priority" of the user story, the number of hours estimated for each user story for development work ("DEV") and for testing work ("TEST"), and the total hours for both development and testing ("Total").

It should be apparent that the project manager viewing the windows in FIG. 4 will want to minimize surpluses and deficits in developer time represented at the bar graphs in windows 422 and 424. While exact balance between estimated work and allocated resources would be ideal, it should be appreciated that the work and resources are only best estimates or approximations (given the nature of software development) and thus a perfect balance will not normally be achievable, even with accurate estimates. However, for purposes of project planning, the screen in FIG. 4 will help the project manager see those iterations where significant differences between work and resources are occurring, and will help the project manager make adjustments to the underlying planning data to achiever better balance.

This is illustrated in FIG. 5, which shows the same screen and windows as in FIG. 4, but with adjustments to data made by the project manager. In particular, reference can be made to the bar graphs 430 of iteration no. 2 in window 422. In iteration no. 2, the deficit has been reduced to −12 hours (from −68 hours in FIG. 4). This has been accomplished by removing certain user stories from iteration no. 2. Specifically, user story nos. 7 and 8 in window 426 have been removed. Such removal can be done by the project manager at the display by selecting those user stories (e.g., with the aid of a mouse of other user interface device), and then selecting a remove function, e.g., actuating a delete button or choosing a remove feature in a drop down menu (not shown). The result of the user story removal is seen in window 426 by the different visual treatment for those user stories (contrasted, with a line through each), and the "In Plan" status for each changing from "Y" to "N" (no). It should also be noted that iteration no. 2 in the testing window 424 is also affected by the removal of the two user story nos. 7 and 8, with a reduction in the deficit for testing during that same iteration (a 9 hour surplus in FIG. 5, in comparison to a −42 hour deficit in iteration no. 2 in window 424 of FIG. 4).

The use of the underlying data window 426 to make adjustments in order to better balance work and resources can be accomplished in ways other than eliminating user stories. As a further example of such adjustments, reference can be had to FIG. 6, which shows the same screen and windows as in FIG. 4, but with changes to the iterations to which certain user stories have been assigned. Specifically, in window 426 of FIG. 6, the underlying data has been changed so that iteration nos. 7 and 8 are to be developed in iteration no. 3, rather than in iteration no. 2 (as in FIG. 4). As can be seen in window 422, the deficit in iteration no. 2 drops to −12 hrs. (in comparison to the deficit in FIG. 4 of −68 hrs.). Of course, the deficit for iteration no. 3 increases to −62 hrs. (in comparison to −6 hrs. in FIG. 4) by moving the work (the two user stories) to iteration no 3. Corresponding changes occur in iteration nos. 2 and 3 in the testing window 424 in FIG. 6.

As should be apparent from the forgoing, the manipulation of underlying data to better balance work and resources is a subjective endeavor, and relies on the skills and experience the project manager to best plan the project. For example, while it might seem that elimination of user stories or the moving of user stories from one iteration to another is arbitrary, the project planner may use his/her own insight in so doing in order to improve overall performance during the project. For example, it may be that eliminated or moved user stories are lower priority components (hence, the reason for displaying the priority of each user story in window 426), and failure to complete them will have less significance. As another example, the project manager may know that some of the developers assigned to work during one particular iteration may be more productive than other developers working during other iterations, and hence a larger illustrated deficit might be tolerable (and overcome) during certain iterations.

Before leaving FIGS. 4, 5, and 6, it should be pointed out that in each of the windows 422 and 424 for the last iteration (iteration no. 6), there is shown both development and testing resources ("DEV Vel" and "TEST Vel") planned for such iteration, but no planned development or acceptance testing work. The reason for this is that the project manager has chosen (for this project) to plan for no user story development during this time period, so that if earlier user stories take longer than expected to develop and test, there will be resources available at the end of the project to complete them.

Since no development work (and no acceptance testing) is planned for iteration no. 6, both windows show surpluses (excess developer and excess test developer hours). Note, however, that in window 424, some regression testing is planned for iteration no. 6 (to complete accumulated regression testing on earlier developed user stories).

Figure 7A:
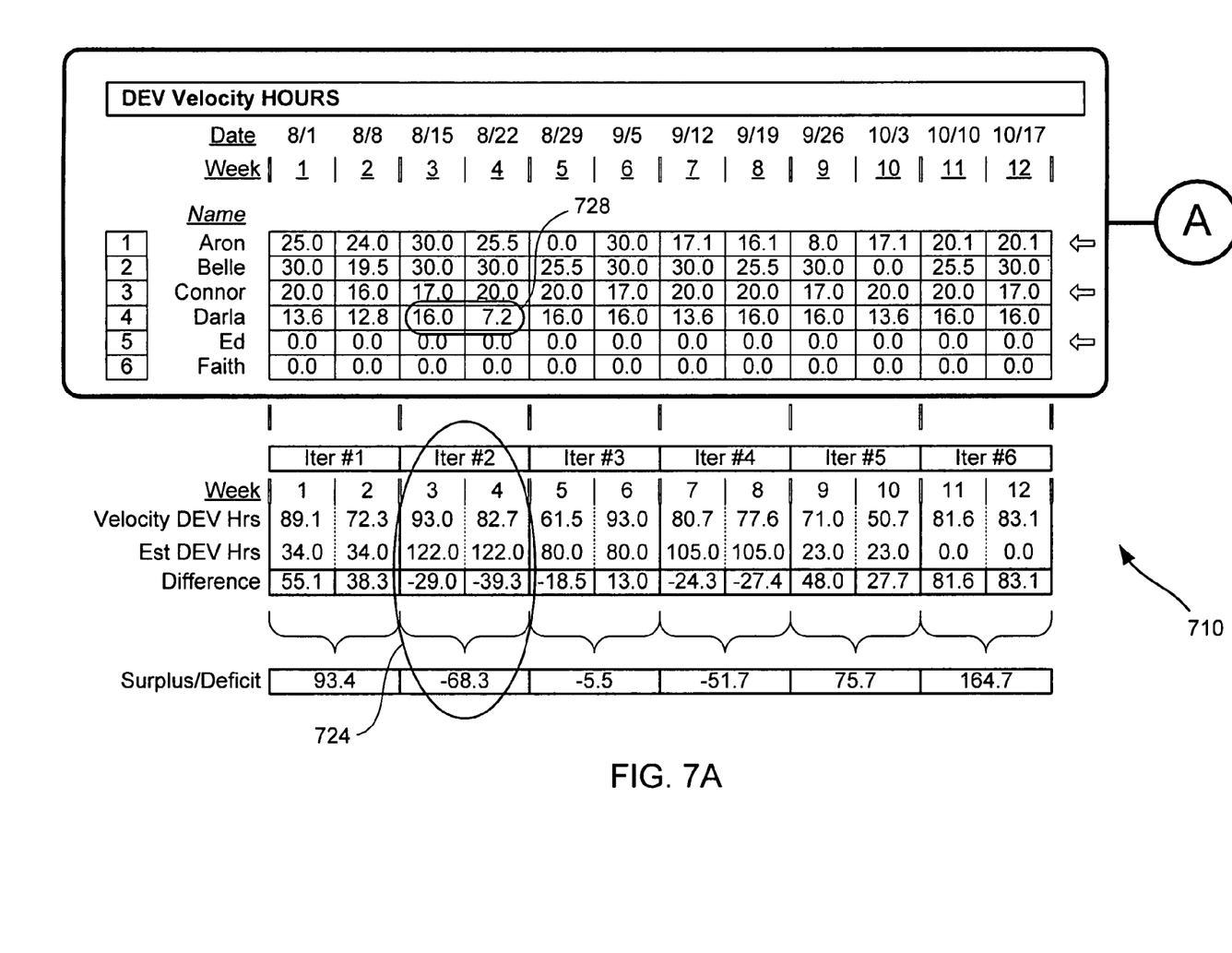
Figure 7B:
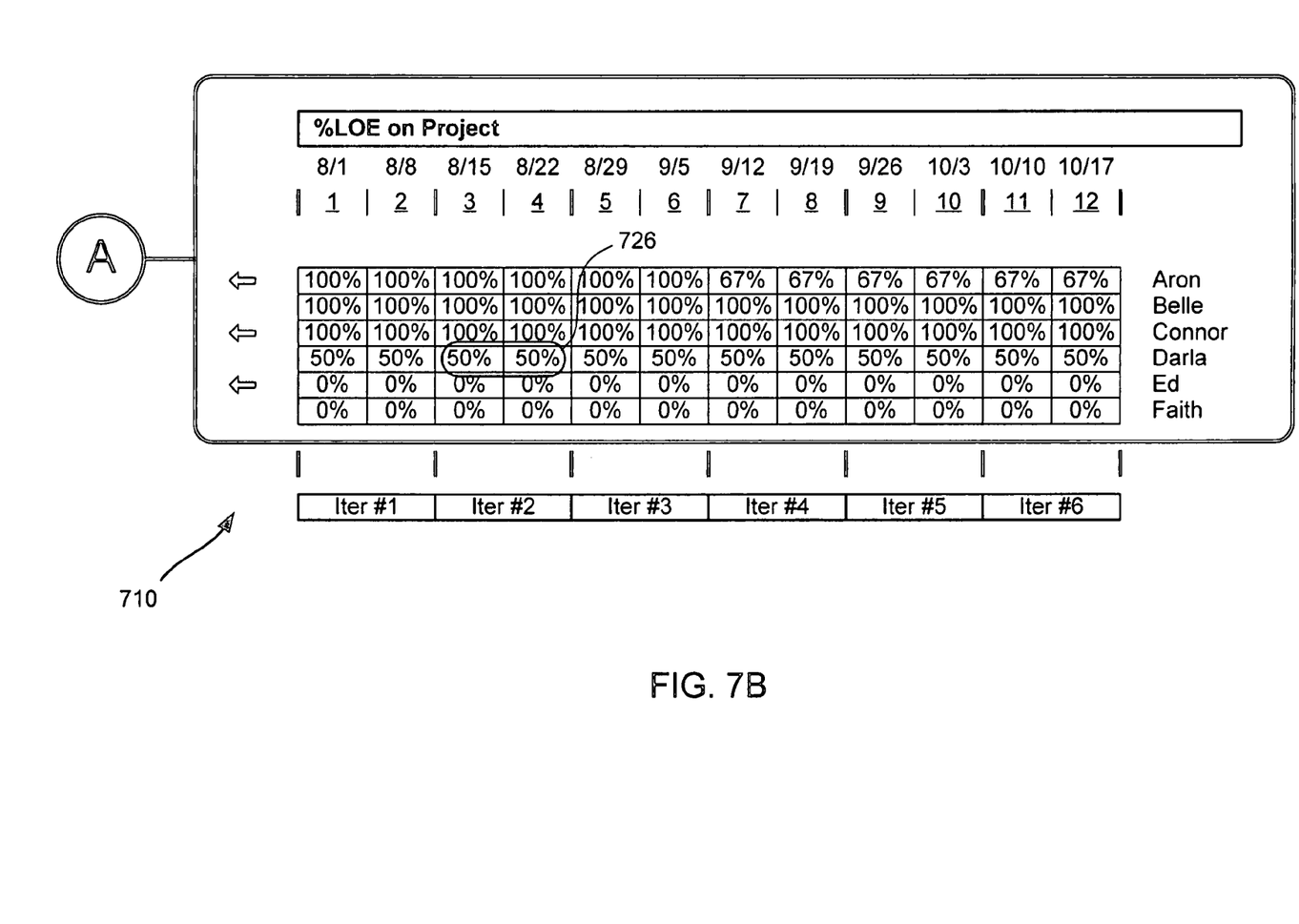

FIG. 7 (consisting of FIGS. 7A and 7B) illustrates yet another way for the project manager to adjust underlying data to better balance work and resources. In FIG. 7, there is seen a screen 710 reflecting underlying data pertaining to development resources (developers assigned to the project). Note that FIGS. 7A and 7B are both part of (and seen together on) the same screen, aligned at point "A." The screen 710 may be a stand alone screen (occupying the full PC screen display 116) or alternatively a window that can be selected at any time to be displayed in lieu of the underlying data screen 426 seen in FIGS. 4, 5 and 6. The screen 710 shows (under the heading "DEV Velocity HOURS" on the left hand side of the drawing) six developers ("Aron", "Belle", "Connor", "Darla" "Ed" and "Faith") and the number of hours during each week (weeks 1 through 12) that each developer will be working on assignments under the project. It should be understood that while a work week usually consist of 40 hours, in each instance the working hours for each developer are less than that because it is assumed the developer has other duties outside the project or, in fact, may have duties related to testing for the same project. (The screen 710 reflects only the developers being used for actual development work on the project, not testing work. There would be a similar, separate screen—not shown—displaying underlying data pertaining to developers assigned to testing).

As mentioned earlier, in the described embodiment each iteration consists of two work weeks. Thus, on the lower side of screen 710 in FIG. 7A, there is seen the iterations corresponding to the work weeks of the project (weeks 1 and 2 comprise iteration no. 1, weeks 2 and 3 comprise iteration no. 2, and so forth).

Referring still to the lower side of FIG. 7A, there are shown for each of the two weeks of each iteration, the number of assigned developer hours ("Velocity DEV Hrs"), the estimated work ("Est DEV Hrs"), the difference between the hours available and the estimated work ("Difference"), and then for that iteration the total (for both weeks) of the difference ("Surplus/Deficit"), which corresponds to the same "Surplus/Deficit" that is seen in window 422 of FIG. 4. As an example, in the screen area (designated by the reference numeral 724) for iteration no. 2 ("Iter #2"), the display shows a total of 93.0 hours for week 3 and 82.7 hours for week 4 for the combined hours of all the developers ("Velocity DEV Hrs"). The display further shows 122 hours for week 3 and 122 hours for week 4, for the hours of estimated work ("Est DEV Hrs"). Finally, there is seen a total deficit of −68.3 hours for that iteration; which corresponds to the deficit (after being rounded off to −68 hours) that was displayed in the "Surplus/Deficit" bar graph for iteration 2 in window 422 of FIG. 4.

Referring to FIG. 7B, the right hand side of screen 710 shows the level of effort ("LOE") for each of the developers, stated in percentage. Thus, for example, referring to the area designated by the reference numeral 726, in iteration No. 2, the developer "Darla" is seen as having 50% of her time dedicated to the project. This equates to 16.0 and 7.2 actual hours (week 3 and week 4) dedicated to the project (referring to the area designated by reference number 728 in FIG. 7A).

While not shown in the drawings, it should be appreciated that a separate screen could be used for entering raw developer data, e.g., the identity of each developer and the total number of hours that each developer has available for the project (per week). The actual hours assigned to the project (DEV Velocity Hours) as seen in FIG. 7A would be automatically computed by taking the available hours and multiplying the by level of effort (LOE) as entered and seen in FIG. 7B.

Figure 8A:
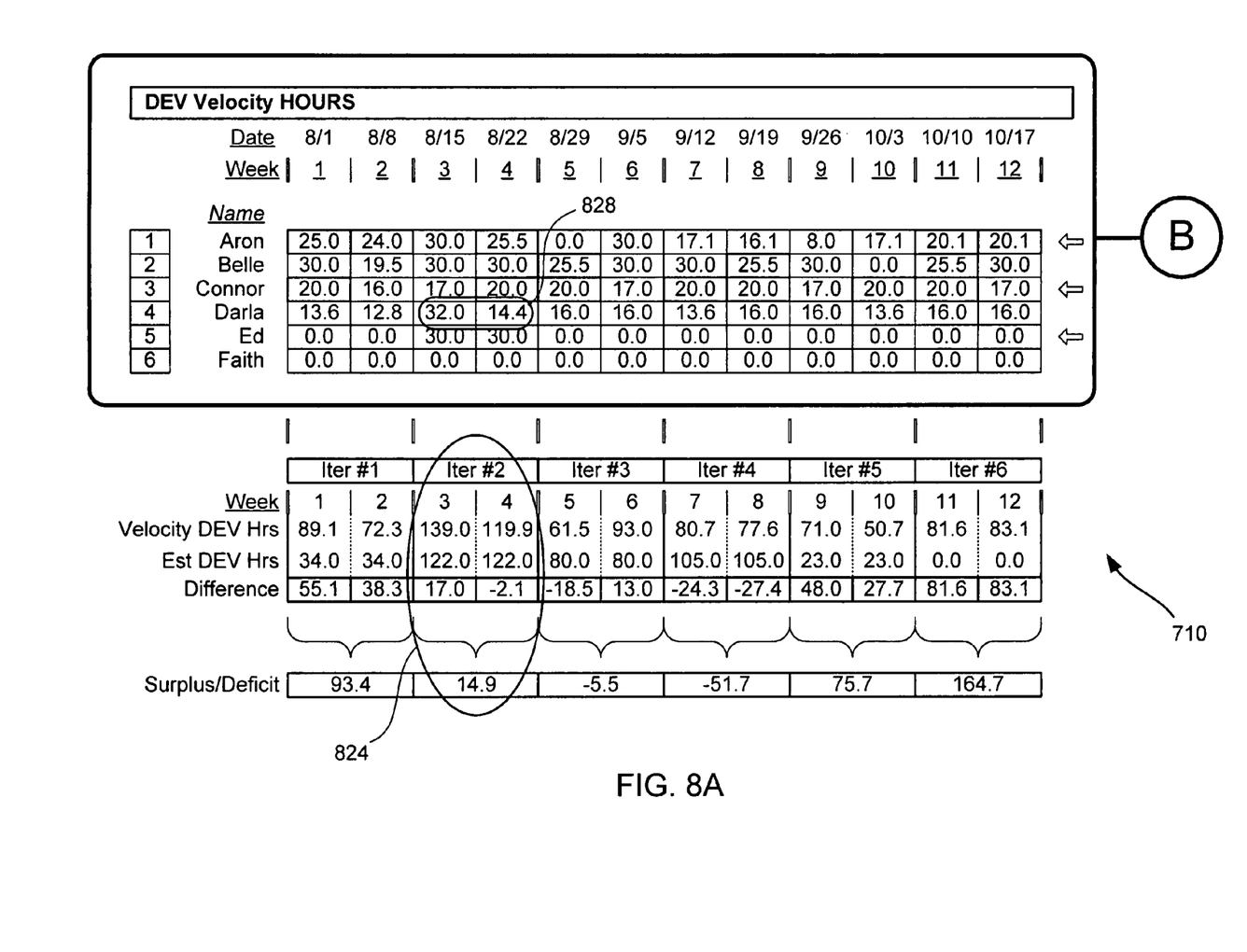
Figure 8B:
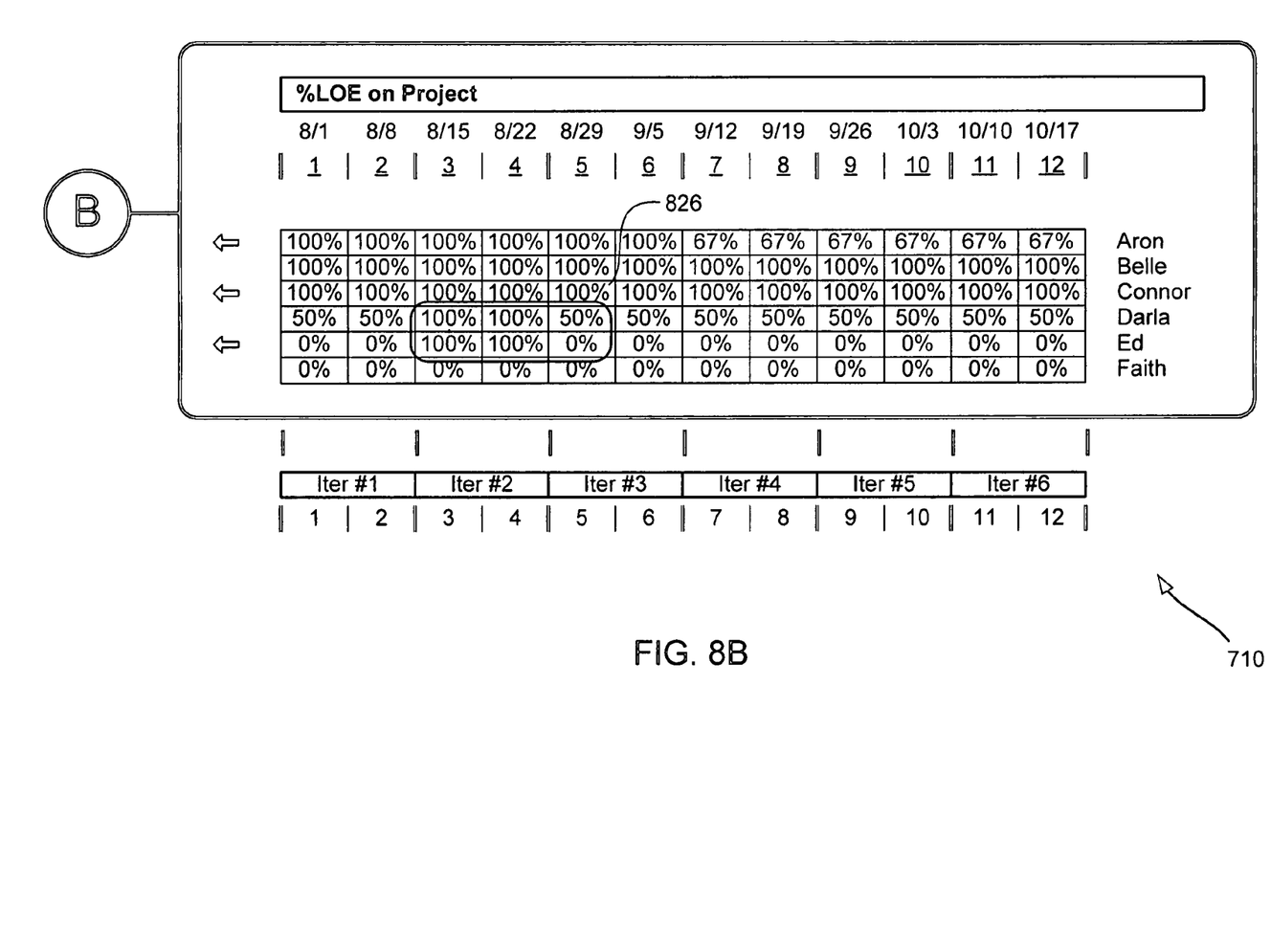
Figure 9:
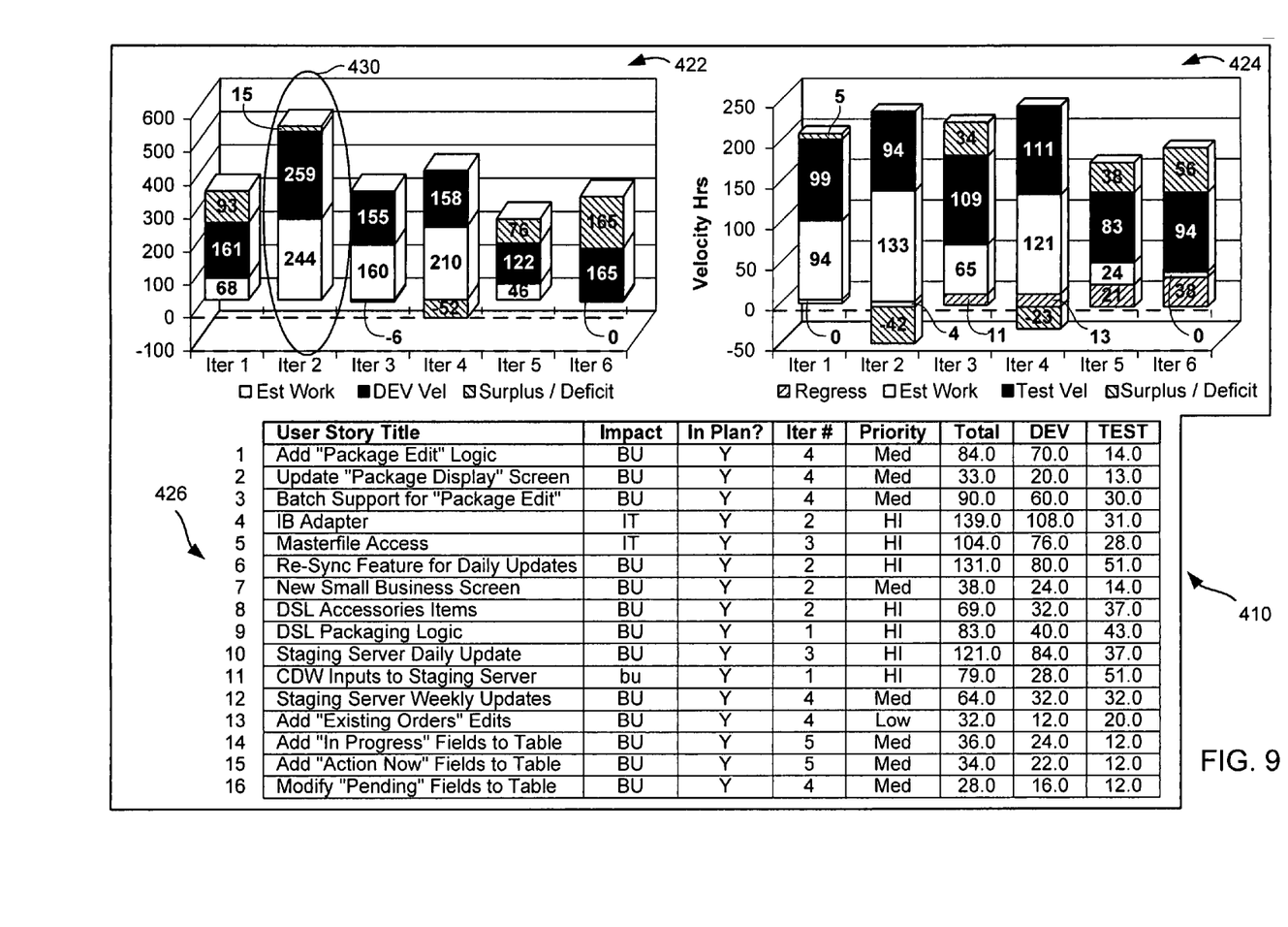

FIG. 8 (consisting of FIGS. 8A and 8B, aligned at point "B") shows the same screen 710, but with adjustments made by the project manager in order to better balance the work/resources for iteration no. 2. As illustrated, the developer Darla has had her LOE increased to 100%, and developer Ed has been added to the project with a 100% LOE (see the area designated by reference numeral 826 in FIG. 8B). This results in the number of hours from Darla doubling to 32.0 and 14.4 for week 3 and week 4, respectively, and 30 hours from Ed in each of week 3 and week 4 (see the area designated by reference number 828 in FIG. 8A). As a result of the increase in resources (additional hours from Darla and Ed), the deficit for iteration no. 2 now becomes a surplus of 14.9 hours (see the area designated 824). This surplus is also reflected automatically in the bar graphs of window 422 in FIG. 9 (the same screen display as in FIGS. 4, 5 and 6), where for iteration no. 2 (designated by reference numeral 930), the surplus (rounded off) of 15 hours is displayed.

Figure 10:
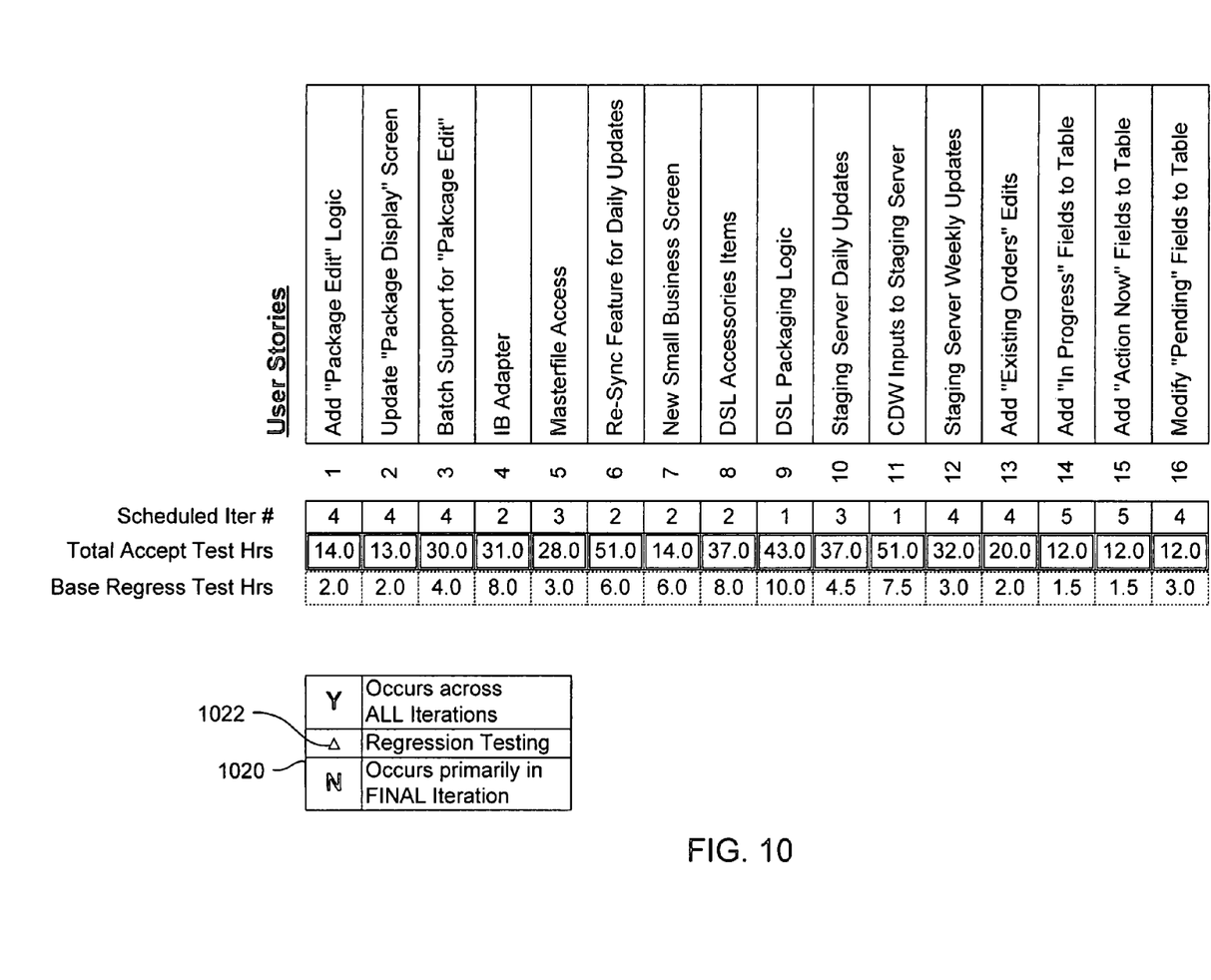

FIG. 10 shows a screen displayed at the user interface 114 (PC display screen) for entering, monitoring and adjusting estimated testing hours for each user story (a similar screen—not shown—can be used for estimating actual development hours). In FIG. 10, for each user story (nos. 1 though 16), there is entered and displayed for each user story the number of hours estimated for acceptance testing ("Total Accept Hrs") and the number of hours for base regression testing ("Base Regress Test Hrs"). It will be appreciated to those skilled in the art that testing may consist of a number of test sub-activities, such as research for determining for the most appropriate test technique, creating and coding a test program, collecting the test data, etc.). While those sub-activities are not shown in FIG. 10, they could be entered and displayed as well in order to arrive at the total hours for acceptance testing.

The estimate for base regression testing is important in complex systems (including developed systems for use with existing or legacy systems), and represents the testing the must be done against each and every other system component (user story) and each of the existing systems. Thus, the system 100 will multiply the base regression testing estimate by the number of other user stories and other existing systems against which it is to be tested. This repeated testing is the reason regression testing increases in hours as more iterations (and user stories) are completed (see FIG. 4, window 424, where regression testing becomes increasingly more noticeable across iteration nos. 3, 4, 5 and 6).

Thus in FIG. 10, even though the base regression test for each user story is relatively small (e.g., 2.0 hours for user story no. 1, 2.0 hours for user story no. 2, and 4.0 hours for user story no. 3), it should be understood that as each newly completed user story is regression tested, all prior user stories are regression tested again, but now against the latest user story (i.e., all prior user stories and the latest user story are regression tested together, after integrated). For example, when user story no. 3 is regression tested, not only are 4 hours spent for testing user story no. 3 (against all prior user stories and any legacy systems), but also there must be regression re-testing of user story no. 1 (2 hours), as well as regression re-testing of user story no. 2 (2 hours), thus resulting in a total of 8 hours of regression testing at user story no. 3.

Also seen in the screen of FIG. 10 is a regression test mode entry menu 1020, for entering "Y" (yes) or "N" (no) for whether regression testing will be done across all iterations as they are completed, or will be held until the final iteration (in FIG. 2, an arrow 1022 pointing up indicates user selection of "Y"). Although not illustrated in the drawings (e.g., window 424 of FIG. 4), if regression testing is held until the last iteration, the number of hours devoted to regression testing will be a significant part of testing at the last iteration, and not a part of any of the other iterations.

Figure 11:
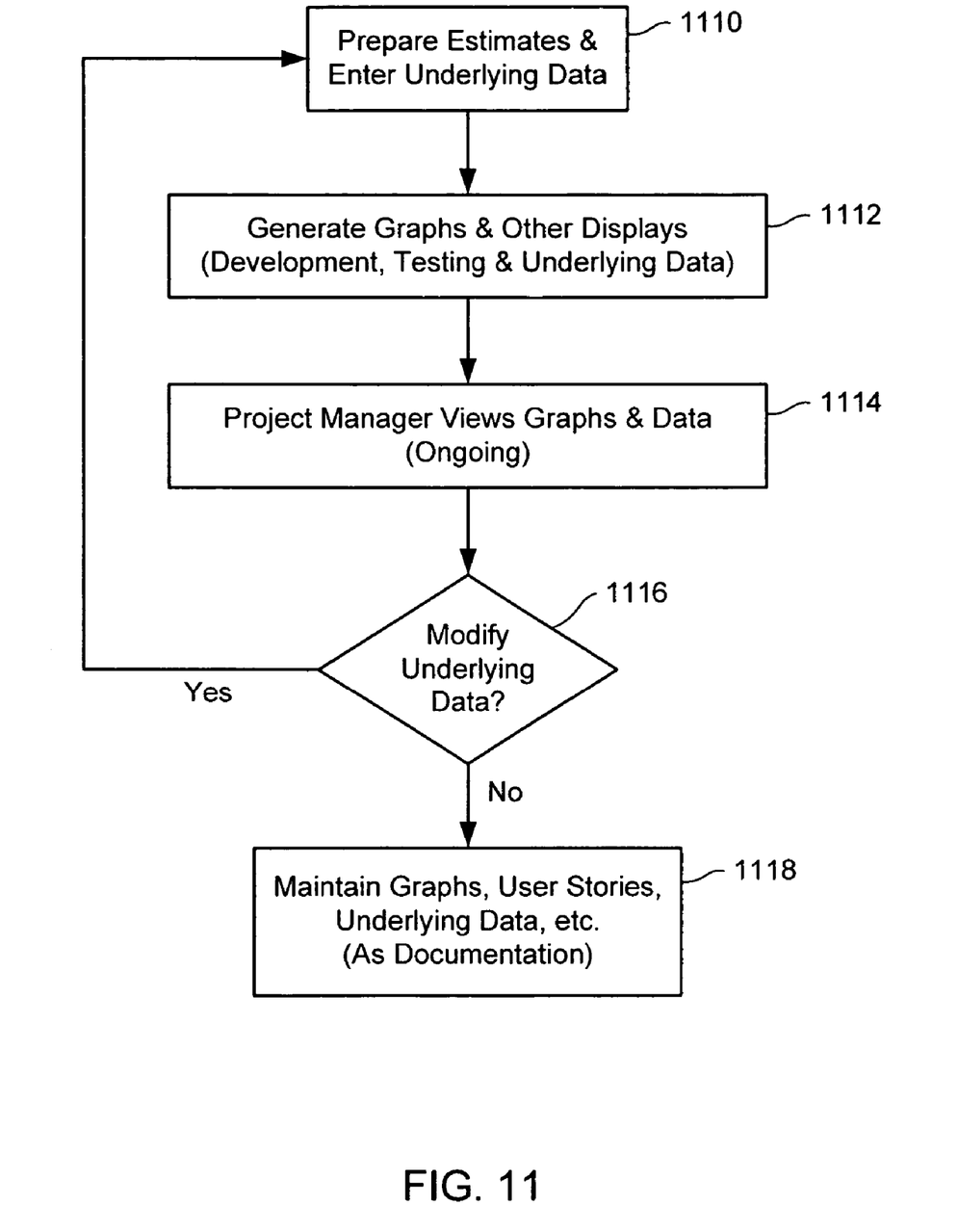
FIG. 11 is a basic flow diagram of the use and the operation of a planning tool in accordance with one embodiment of the invention.

FIG. 11 is a simplified flow diagram illustrating the programming and process used by a project manager at the system 100. As seen, at step 1110 the project manager estimates (as necessary) and then enters the various underlying data needed to generate the graphs and displays used for planning the project. In particular, using, e.g., the screens seen in FIGS. 4, 7 and 10, the project manager enters the data illustrated and described earlier in conjunction with FIG. 1 (number of iterations, user story information—including the iteration chosen for each user story, work estimates, developer resources, and the regression testing mode). In regard to work estimates and developer resources, the project manager estimates the number of hours for both developing the user story (software) and for testing (both acceptance and base regression testing) the user story. The project manager also enters each developer, their hours available per week and their level of effort to be dedicated to the project.

At step 1112, the system generates various graphs and displays (e.g., windows 422 and 424 in FIG. 4) based on the entered data, as well as displays underlying data (e.g., window 426). At step 1114, the project manager views and monitors the displays initially and during the course of the project (on an ongoing basis).

At points during the project (particularly initially, after data is entered, but also continuing throughout the project), the project manager needs to determine whether any of the underlying data needs to be modified, step 1116. Depending on the needs and desires of the manager, the system 100 may be programmed to issue a query or reminder at critical points during the project (e.g., at critical scheduled delivery dates) or at regular intervals (e.g., at the beginning of each week). If the underlying data is to be modified, the system takes the manager to step 1110 to view the data entry screens. If data is not to be modified, then the system maintains all the underlying data and graphs (step 1118). It should be pointed out that in maintaining the data and graphs, the system may be programmed to periodically print out the various screens in hard copy or other tangible form, as a documented record of the project. These printed screens, as well as other documents generated during the project (e.g., customer feedback forms, sign-offs on testing and delivery, etc.) are maintained as permanent records in the event the same are needed for corporate governance or regulatory purposes.

While the system 100 is described as planning tool for managing software development projects, it should be appreciated that the present invention could be employed for other types of development projects (e.g., hardware). Further, while the described embodiments are referred to in the context of a single project manager, it should be appreciated that in an alternative embodiment there could be a number of personnel using the system 100 for project planning/management purposes. In such an embodiment, the system 100 could comprise one or more servers connected in a network (private or public/internet) with a plurality of PCs or other workstations, with each project manager using his/her workstation for managing (alone or collectively with others) one or more development projects.

While a detailed description of presently preferred embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. In a system having a processor for managing a development project having a planned number of project components to be completed, wherein the project is divided into a series of development periods, with each project component assigned to one of the development periods, wherein for each development period there is a planned amount of work and a planned amount of resources, and wherein the development project involves both the development of project components as well as a testing of project components, a graphical user interface, comprising:
    a first window for displaying to a user a graph illustrating both the total work and the total resources for the development of project components during at least one development period;
    a second window for displaying a graph illustrating both the total work and the total resources for the testing of project components during at least one development period; and
    a third window for displaying data underlying the graphs displayed in the first and second windows, wherein the underlying data in the third window may be displayed for modification, so that as the underlying data is modified, corresponding modifications are made to the graphs in the first and second windows.

2. The graphical user interface of claim 1, wherein the development project is a software development project.

3. In a system having a processor for managing a software development project having a planned number of project components, wherein the project is divided into a series of development periods, with each project component assigned to one of the development periods, wherein for each development period there is a planned amount of work and a planned amount of resources, and wherein the development project involves both the development of project components as well as a testing of project components, a graphical user interface, comprising:
    first window means for displaying a graph illustrating both the total work and the total resources for the development of project components during at least one development period;
    second window means for displaying a graph illustrating both the total work and the total resources for the testing of project components during at least one development period; and
    third window means for displaying data underlying the graphs displayed in the first and second window means, wherein the underlying data in the third window means may be displayed for modification, so that as the underlying data is modified, corresponding modifications are made to the graphs in the first and second window means.

4. A method for a user managing a development project having a planned number of project components to be completed, and wherein the project is divided into a series of development periods, with each project component assigned to one of the development periods, wherein for each development period there is a planned amount of work and a planned amount of resources, so that for each development period there is a total of work and a total of resources associated with project components within that development period, and wherein the development project involves both the development of project components as well as a testing of project components, the method comprising:

providing a graphical user interface (GUI);

displaying to the user at the GUI a first graph illustrating for at least one development period both the total work and the total resources for the development of project components during that development period;

displaying simultaneously to the user at the GUI a second graph illustrating for at least one development period both the total work and the total resources for the testing of developed project components during that development period;

displaying simultaneously to the user at the GUI underlying data associated with planned work and planned resources for each project component, and wherein the GUI has a first display area for displaying the first graph, a second display area for displaying the second graph, and a third display area for displaying the underlying data; and     adjusting by the user of the underlying data in the third display area for at least one of the planned work and the planned resources so that the impact of the adjustment can be observed at least at one of the first and second graphs displayed at the GUI.

5. The method of claim 4, wherein the development project is a software development project.

6. The method of claim 5, wherein the development process comprises an extreme programming (XP) process, and wherein the project components are defined by user stories.

7. The method of claim 4, wherein a plurality of graphs representing a plurality of development periods are displayed on the GUI.

8. The method of claim 4, wherein the planned amount of work and the planned amount of resources are each expressed in hours.

9. The method of claim 4, wherein the step of adjusting planned work is accomplished by changing the number of project components within the one development period.

10. The method of claim 4, wherein a plurality of developers are assigned to the project, wherein each developer has a planned level of effort for the development project, and wherein the step of adjusting is accomplished by changing the level of effort.

11. The method of claim 10, wherein each developer has a total number of hours available for the development project for the one development period, and wherein the level of effort is expressed as a percentage of those available hours.

12. The method of claim 4, further comprising simultaneously displaying on the GUI underlying data associated with each project component, the underlying data including impact data representing an indication of whether or not the completion of the project component is mandatory.

13. The method of claim 12, wherein project components consist of components specified by a user and project components specified by a developer, and wherein the mandatory project component is one specified by a developer.

14. The method of claim 4, wherein the step of adjusting is performed using the third display area.

15. The method of claim 4, wherein the project components are software, and wherein the testing of the project components comprises acceptance testing for each individual project component, and wherein the total work for testing illustrated at the second graph is the total work associated with acceptance testing.

16. The method of claim 15, wherein the testing further comprises regression testing, and wherein the method further comprises displaying, as part of the second graph, the total work associated with regression testing for the one development period, the regression testing illustrated separately from the acceptance testing.

17. The method of claim 15, wherein the regression testing comprises testing a completed project component multiple times, including once after each of multiple subsequent project components are completed.

18. The method of claim 4, further comprising, as part of the steps of displaying first and second graphs, illustrating the difference between the total work and the total resources.

19. The method of claim 4, wherein the first and second graphs comprise multiple bar graphs, with one of the multiple bar graphs representing total work and another of the bar graphs representing total resources.

\* \* \* \* \*

UNITED STATES PATENT AND TRADEMARK OFFICE
CERTIFICATE OF CORRECTION

PATENT NO. : 7,562,338 B2  
APPLICATION NO. : 10/721812  
DATED : July 14, 2009  
INVENTOR(S) : Knutson et al.

Page 1 of 1

It is certified that error appears in the above-identified patent and that said Letters Patent is hereby corrected as shown below:

<u>Figure 10,</u>  rotate figure 180° clockwise so that "User Stories" appears at top right, therefor.

<u>Figure 10,</u>  "User Stories" table, Line 3, replace "Pakcage" with "Package", therefor.

<u>Column 1,</u>  Line 64, replace "there may several" with "there may be several", therefor.

Signed and Sealed this

Fifteenth Day of September, 2009

David J. Kappos  
*Director of the United States Patent and Trademark Office*